(12) United States Patent
Sorensen et al.

(10) Patent No.: US 7,937,686 B2
(45) Date of Patent: May 3, 2011

(54) NAME-BASED IDENTIFIERS OF MODEL ELEMENTS

(75) Inventors: Peter Sorensen, Frederiksberg (DK); Lars Hammer, Frederiksberg (DK); Christian Damm, Hillerod (DK); Jens Jensen, Birkeroed (DK); Morten Nielsen, Skodsborg (DK); Thomas Hejlsberg, Horsholm (DK)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 11/787,513

(22) Filed: Apr. 17, 2007

(65) Prior Publication Data
US 2008/0263508 A1    Oct. 23, 2008

(51) Int. Cl.
G06F 9/44    (2006.01)
(52) U.S. Cl. ........................................ 717/104
(58) Field of Classification Search .................. 717/100, 717/104
See application file for complete search history.

(56) References Cited

U.S. PATENT DOCUMENTS

| | | | |
|---|---|---|---|
| 6,606,618 B2 | 8/2003 | Delo | 707/2 |
| 6,931,414 B1 | 8/2005 | Oh | 707/102 |
| 7,016,976 B2 | 3/2006 | Merrells et al. | 709/245 |
| 7,039,574 B1 | 5/2006 | Roesner et al. | 703/17 |
| 7,177,769 B2 | 2/2007 | Larsson et al. | 702/45 |
| 2002/0124118 A1* | 9/2002 | Colley et al. | 709/315 |
| 2005/0066338 A1 | 3/2005 | Bloesch | 719/328 |
| 2005/0198057 A1 | 9/2005 | Antoch | 707/102 |
| 2006/0117037 A1 | 6/2006 | Gutz et al. | 707/100 |
| 2006/0259541 A1 | 11/2006 | Bernabeu-Auban et al. | 709/202 |
| 2006/0265407 A1* | 11/2006 | Claussen et al. | 707/100 |
| 2007/0169071 A1* | 7/2007 | Martin et al. | 717/166 |
| 2008/0216052 A1* | 9/2008 | Hejlsberg et al. | 717/114 |

OTHER PUBLICATIONS

Friesen, N., "Recommendations for Globally Unique Location-Independent, Persistent Identifiers", Athabasca University, Jul. 2002, 13 pgs.
Various Contributors, see Publication: "Universal Business Language (UBL) Naming and Design Rules", Nov. 2004, 104 pgs.
Appukuttan et al., B. "A Model Driven Approach to Model Transformations", 12 pgs.

* cited by examiner

*Primary Examiner* — Philip Wang
(74) *Attorney, Agent, or Firm* — Westman, Champlin & Kelly, P.A.

(57) ABSTRACT

Embodiments of the present invention pertain to implementation of textual names as the actual identifiers of elements of models. A structured system provided for constructing the textual names so as to be unique in a specific context. In one embodiment, namespaces are added to a name as a mechanism for ensuring uniqueness across multiple development sources. In one embodiment, upon deployment to a runtime environment, alternate names are assigned to support efficient processing.

17 Claims, 5 Drawing Sheets

NAME-BASED IDENTIFIERS OF MODEL ELEMENTS

BACKGROUND

In the abstract, every piece of software is based on a model of a piece of reality. The model defines the data that the software manipulates, as well as rules for manipulation. Often, the model is implicitly buried in the code of an application, and a new piece of software has to be developed for a different model.

That being said, a certain kind of software is built around a runtime framework designed to interpret or execute explicit instances of models. Such "model-centric" software typically will include tooling to create models for the runtime framework. Thus, in effect, the model tooling is used to develop applications. The definition of what models can be made and executed (i.e., a model for the model) has traditionally been referred to as the metamodel for the tooling and model framework.

Model-centric software typically will target either general purpose application development or development within a more specific domain. In some cases, the software supports enhancements to a standard application through the addition and/or modification of a corresponding model. For example, enhancements might be made directly by a consumer of the model-centric software, by the vendor of the software and/or by a third party entity (i.e., an entity other than the vendor or consumer).

Many existing model-centric applications implement some system of machine-friendly identification of model elements, probably due to the inherent characteristic of computational efficiency. For example, in some applications, integers are used to identify model elements such as tables, reports, forms and the like. In recognition of the fact that machine-friendly is often not very friendly to humans, some systems do add an auxiliary textual name for a model element that can be used when referring to model elements, for example, from user interfaces.

When a single party develops an entire application, making sure that each model element has a unique identifier is a somewhat manageable task. However, in situations where multiple mutually independent parties contribute to the model of a given application, ensuring uniqueness becomes a challenge. If integers are used as identifiers, one possible scheme is to centrally allot a series of consecutive numbers to individual contributors, but this requires managerial overhead and can result in real problems when numbers run out. The practical limits imposed by a given identification scheme very well may not be adequate for all applications.

One way to alleviate some of the noted issues is to allow a model to be exported without integer identifiers assigned. Instead, new integer identifiers can be assigned when the model is imported. However, there is risk that significant inconsistencies will be introduced if the renumbering process is triggered at an inopportune time. For example, during an upgrade, renumbering could be a critical mistake if the identifiers are relied upon for updating purposes such as to automatically update definitions of database tables. If, during an upgrade to a new version, tables are assigned integer identifiers that were previously assigned to other existing tables, a loss of business data is possible if not likely. This is but one example of many problems that can arise upon implementation of a renumbering scheme.

Under the circumstances, there is a temptation to use identifiers that are somehow "more" unique than integers, and GUIDs (i.e., identifiers that statistically are unique) are an obvious candidate. A problem with GUIDs; however, is that, by definition, they are meaningless for humans. Thus, if references between model elements are based on GUIDs, it becomes very cumbersome for humans to understand what is being referred to. Also, it becomes generally difficult to fix up broken references when they occur. In addition, GUIDs are less computationally efficient than integers, which makes them less attractive as identifiers.

The discussion above is merely provided for general background information and is not intended for use as an aid in determining the scope of the claimed subject matter.

SUMMARY

Embodiments of the present invention pertain to implementation of textual names as the actual identifiers of elements of models. A structured system provided for constructing the textual names so as to be unique in a specific context. In one embodiment, namespaces are added to a name as a mechanism for ensuring uniqueness across multiple development sources. In one embodiment, upon deployment to a runtime environment, alternate names are assigned to support efficient processing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

At least some embodiments of the present invention pertain to systems and methods for assigning identifiers to components of a model within a software development environment that, to some extent, is model-oriented. Those skilled in the art will appreciate that there are different ways in which a model can be relied upon depending upon the nature of a given software development environment. The present description will below describe embodiments in the context of a model-centric software system in which model components are essentially part of the application code. However, those skilled in the art will appreciate that the scope of the present invention is not so limited. The same or similar concepts could just as easily be incorporated into a different model-oriented development environment such as, but not limited to, an environment wherein a model is simply utilized as a guide within a code-development process.

Figure 1:
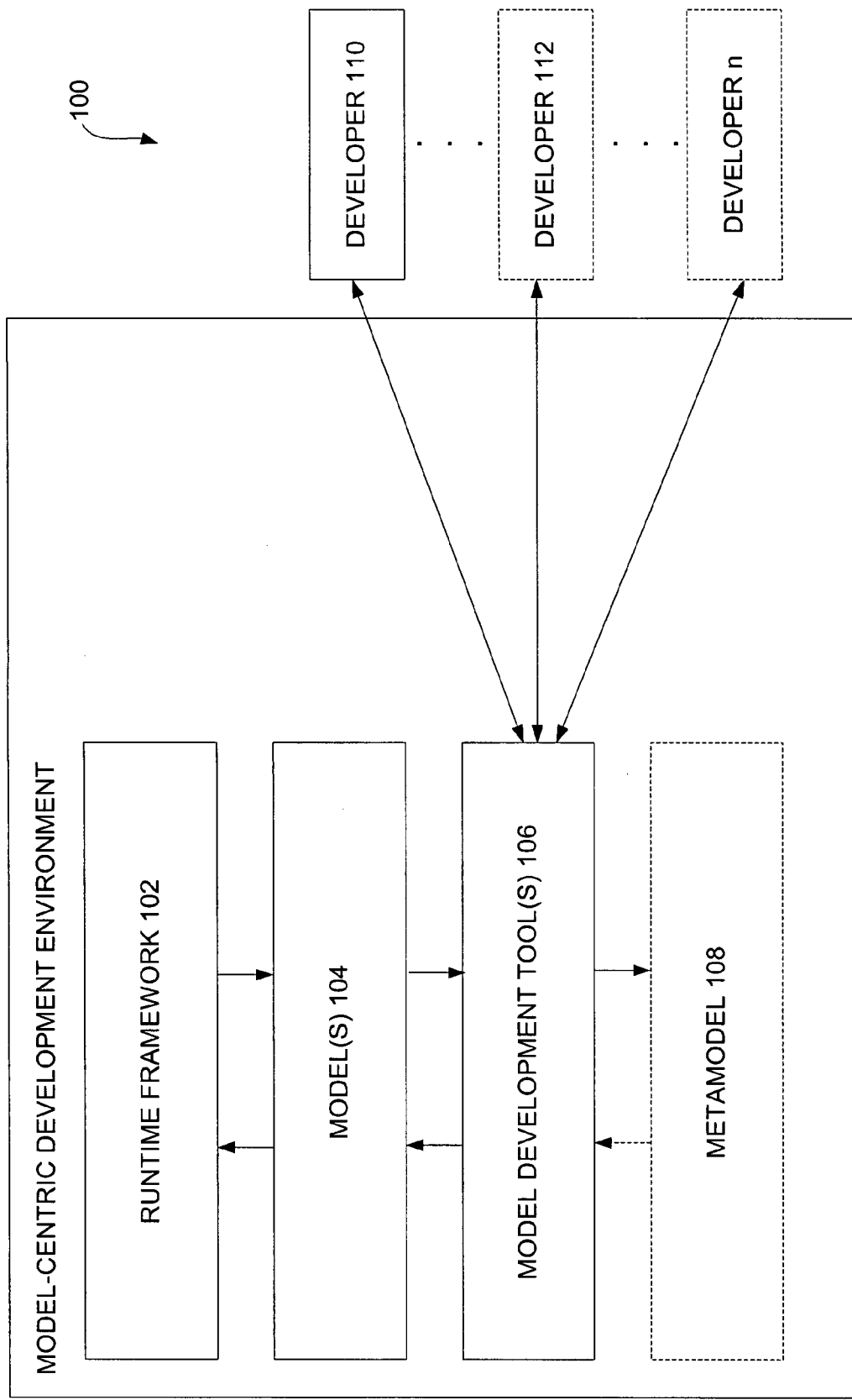
FIG. 1 is a schematic illustration of a model-centric software development environment.

FIG. 1 is a schematic illustration of a model-centric software development environment 100. Environment 100 is but one of many examples of development environments in which embodiments of the present invention may be implemented. The scope of the present invention is not limited to environment 100. Nor is it limited to any illustrated component or combination of illustrated components.

Environment 100 includes a runtime framework 102 that is illustratively designed to interpret or execute explicit instances of a model or models 104. One or more model development tools 106 are provided to support creation and/or manipulation of models 104, which are utilized by the runtime framework 102. Thus, in effect, the development tools 106 are used to develop applications. In one embodiment, a metamodel 108 is provided so as to guide and/or restrict the development of models 104. Metamodel 108 illustratively provides a definition of what models can be made and executed within the context of tooling 106 and the related model framework.

When a single party 110 develops an entire application within environment 100, making sure that individual elements within models 104 have a unique identifier is a somewhat manageable task. However, in situations where many mutually independent parties contribute to the models, ensuring uniqueness becomes a challenge. For illustrative purposes, additional developers 112 through an unlimited number n are shown in FIG. 1.

Text is human-friendly and therefore well suited for the identification of the elements of models 104 at design time. However, identifiers generally should be unique, which human-friendly names are usually not. In one embodiment, this dilemma is addressed by allowing only textual names as the actual identifiers of elements of models 104, and then implementing a structured system for constructing the textual names so as to be unique in a specific context. In other words, for a given name, a context of uniqueness is determined and utilized as a basis for maintaining distinctiveness. Namespaces are added to a name as a mechanism for ensuring uniqueness, for example, uniqueness across multiple development sources (e.g., multiple organizations and/or projects) that contribute to models 104.

The described approach for naming model elements puts the human—rather than the machine—in control. The developer is empowered to provide meaningful names to model elements and, if organizations agree to use unique namespaces, uniqueness is ensured as well. In effect, references between model elements become meaningful to anyone who understands the domain of the particular model.

Accordingly, as opposed to being used as mere auxiliary identifiers, human-friendly textual names are utilized as the actually implemented identifiers of model elements. Under the circumstances, choosing names becomes an especially important undertaking. Renaming a model element also becomes especially significant because it can break/redefine references that may exist in pieces of the model not known to the person defining the model element (though it may be worth noting that one embodiment described below pertains to use of a short notation that is unique within but not across a concept, thus making it more robust to name changes in that changes to a namespace or concept name will not have an impact). Some example implementation details will now be provided.

Figure 2:
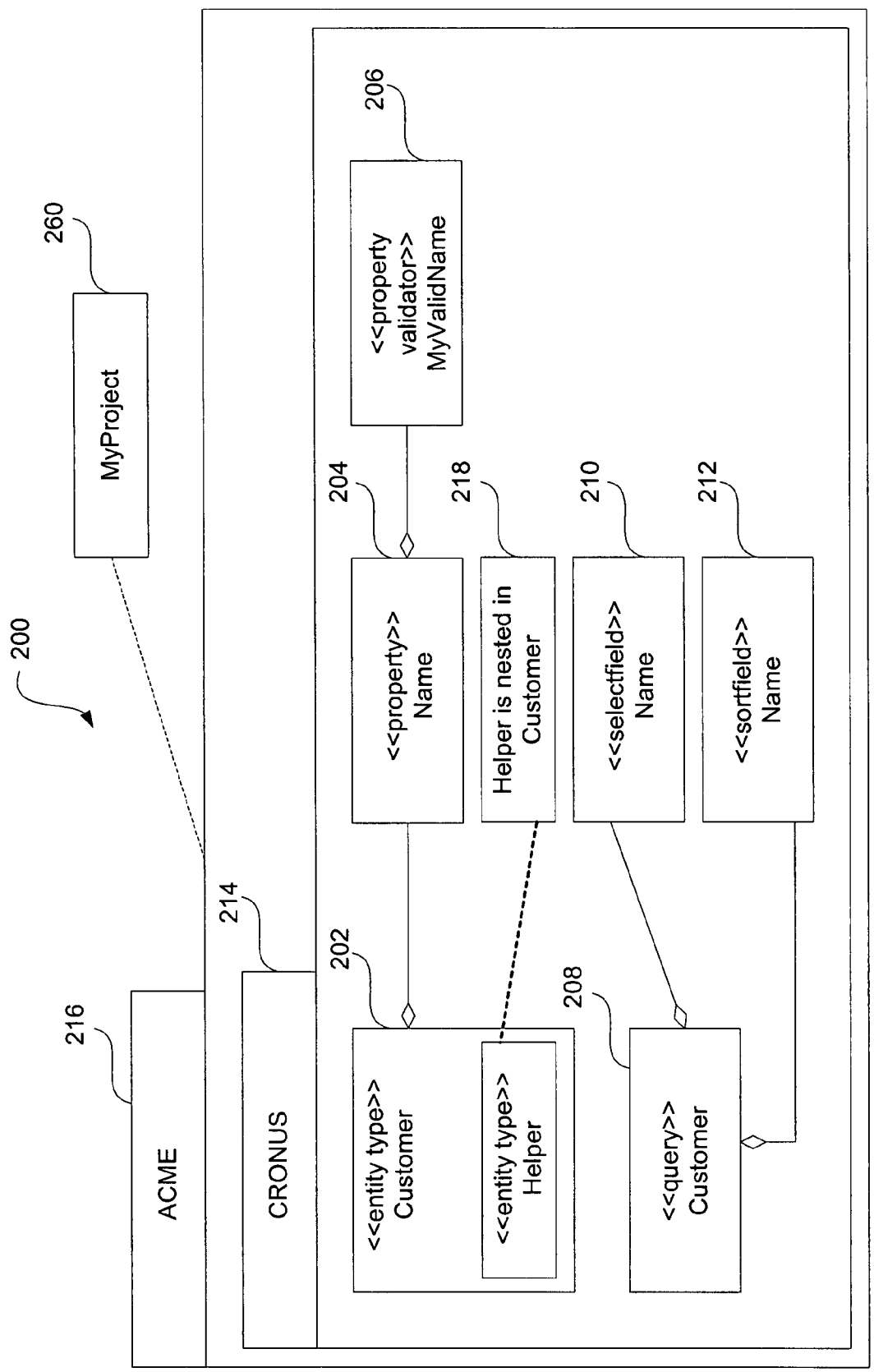
FIG. 2 is a schematic illustration of a simplified model.

FIG. 2 is a depiction of a model 200 specified in UML notation. Model 200 is a simplified example of what, in accordance with one embodiment, a model 104 might look like. Model 200 is but one example of an implementation provided solely for contextual purposes only. The present invention is not limited to the illustrated configuration. Nor is it limited to any illustrated component or combination of illustrated components.

With specific reference to model 200, an entity type 202 (Customer) has a property 204 (Name) and a property validator 206 (MyValidName). Further, the model contains a query 208 (Customer), in which both the select field 210 and the sort field 212 are Name. Both the query 208 (Customer) and the entity 202 (Customer) have a namespace 214 (Cronus), which is part of the namespace 216 (ACME). Both namespaces fall within the scope of an overarching project 260, which is identified in FIG. 2 as "MyProject."

Elements of model 100 are illustratively identified using a name-based approach. Each individual element name is further scoped by either its parent or its composing collection. Names of top-level elements (which may be referred to herein as "concepts") are illustratively scoped by namespaces. The entity property validator 206 (MyValidName) illustratively has the identifier:

ACME.Cronus:Customer.Name.MyValidName

An entity 218 (Helper) is illustratively nested within entity 202 (Customer) to indicate that it is a separately factored part of entity 202 (Customer). Entity 218 illustratively has the identifier:

ACME.Cronus:Customer+Helper

The query select field 210 (Name) illustratively has the identifier:

ACME.Cronus:Customer(queries).Name

The query sort field 212 (Name) illustratively has the identifier:

ACME.Cronus:Customer(queries).Name(sorting)

Figure 3:
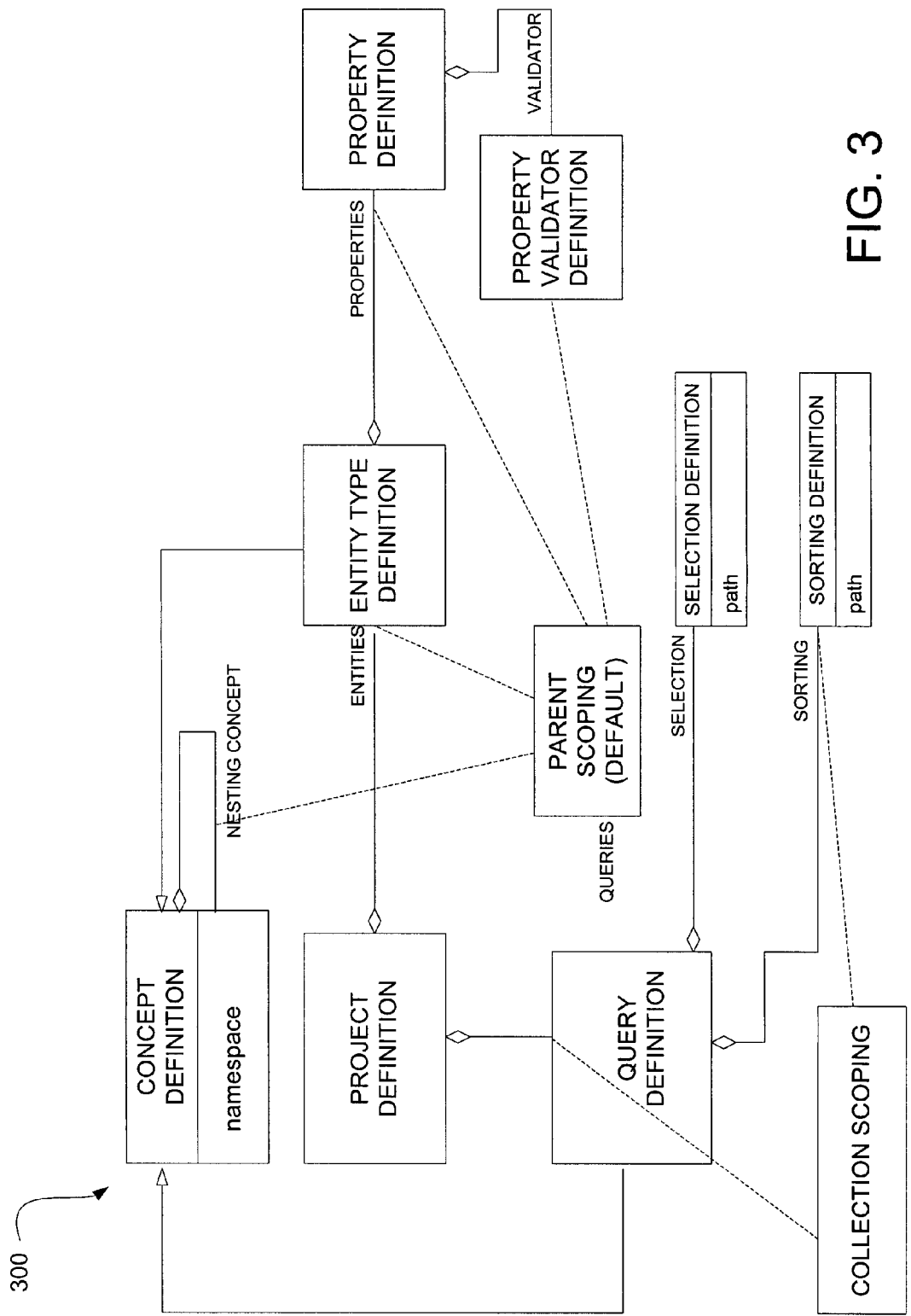
FIG. 3 is a schematic illustration of a simplified metamodel.

In one embodiment, at least some of the characteristics of the applicable naming convention are applied based on the configuration of a corresponding metamodel. For example, the term "sorting," as used in the field 210 identifier, as well as "queries," as used in the field 212 identifier, illustratively come from a corresponding metamodel 300 that is illustrated in FIG. 3. It is illustratively up to the designer of the metamodel to choose a naming strategy that determines whether collection names from the metamodel will be included in the model element identifiers. For example, a designer can choose not to include "queries" in the query identifier, and this illustratively means that a query must have a different name than an entity within the same namespace. Entity 202 (Customer) illustratively does not contain "entities" because the metamodel designer chose to use parent scoping in the metamodel rather than collection scoping. As is shown in metamodel 300, a collection scoping configuration is associated with query and sorting definitions.

It should be noted that metamodel 300 is a simplified example of what, in accordance with one embodiment, a metamodel 108 might look like. Metamodel 300 is but one example of an implementation provided solely for contextual purposes only. The present invention is not limited to the illustrated configuration. Nor is it limited to any illustrated component or combination of illustrated components.

As with many models, model 200 has a hierarchical structure in which top-level elements compose sub-elements. Again, a logical top-level element is illustratively referred to herein as a "concept." However, it should be noted that not all concepts are necessarily actual top-level elements from a naming perspective, for example, if concepts are allowed to nest other concepts. The term "concept," as it is used herein, is intended to provide a general means for at least loosely identifying, in a logical sense, a top-level element and its hierarchically organized sub-elements when there is a need to distinguish.

A concept is illustratively an element, but sub-elements are not concepts. For example, in a given implementation, tables may compose fields, reports may compose data sections, forms may compose controls, etc. In one embodiment, to reference one of these nested model elements, such as the field of a table, the "containment path" of identifiers is used. For example, to identify the field, the identifier of the owning table is needed along with the identifier of the field. A set of fields for a particular table may have its own identifier series, so the identifiers of nested elements can be scoped by the identifier of their owning element. Accordingly, the names of individual fields may not be unique across different tables.

However, the scope of the owning element is not always enough. Sometimes either the type of the nested element or the collection to which it belongs needs to be part of the "containment path" to ensure uniqueness. For example, a given implementation may define both fields and fieldgroups for a table, and a fieldgroup can have the same identifier as a field on the same table. Thus, to distinguish between the two, we need to know a priori whether we are looking for a field or a fieldgroup. To contrast this, some programming languages require nested elements to have different names, even if they differ in type. For example, a method cannot have the same name as a data member on the same class.

Thus, in one embodiment, each collection of elements in the metamodel defines whether the names of elements in the collection are scoped by the owning element (i.e., parent scoping) or by the collection itself (i.e., collection scoping). A variation hereof is to let the type of a model element define that the names of model elements of this type are scoped by the type itself. This effectively means that if a model contains two or more collections that may hold the same type of elements, name uniqueness applies across those collections. Because metamodel elements are likely to rarely contain multiple collections of the same type, this, in practice, is only subtly different than scoping names by the collection.

The naming examples provided above incorporate a concrete syntax that can be expressed as follows using Backus-Naur form:

<identifier>: :=
    <namespace name>['.'<sub namespace name>]*':'
    <concept name>['('<collection name>')']
    ['+'<concept name>['('<collection name>')']]* (nested concepts)
    ['.'<element name>['('<collection name>')']]* (sub elements)

It should be noted that this syntax example is simply an example of what, in accordance with one embodiment, a syntax might look like. The example is provided solely for contextual purposes only. The present invention is not limited to the illustrated syntax. Nor is it limited to any illustrated component or combination of illustrated components.

That being said, the illustrated syntax is advantageous in that it is name-based and therefore gives a human an opportunity to be in control. It also supports the use of namespaces to let independent developers create unique identifiers. It also supports the two different approaches for scoping of the names of sub-elements. It uses a specific delimiter, ':', between the namespace part and the name part of the identifier, which is different than the delimiter, '.', used between sub-elements and between sub-namespaces. This enables efficient (e.g., no look-ahead) parsing of identifiers.

Accordingly, in one embodiment, references to model elements are captured using an identifier syntax such as, but not limited to, the example syntax provided herein. However, in some cases, the metamodel will introduce references between model elements that are by design constrained within the same concept. For example, the notion of a Key of an Entity Type may be defined as a reference to one of the Properties of the Entity Type, in which case it only makes sense to use properties of the Entity Type that defines the Key. In one embodiment, for such a local reference, a short form of the syntax is supported in which the identifier of the containing concept can be omitted. For example, "ACME.Cronus:Customer.Name" identifies the property in the sample above but the much shorter form "Name" is sufficient for a local reference such as the one used to define a Key for Customer.

Thus, an alternate syntax can be implemented that differs from the previous syntax at least by allowing empty namespaces. Also, a given syntax can be configured to support classic model configurations. An alternate syntax might look something like:

| | | |
|---|---|---|
| Identifier: : | = | Namespace':' |
| | | <ConceptName>['(RoleName')'] |
| | | ['+'ConceptName['('RoleName')']]* (nested concepts) |
| | | ['.'ElementName['('RoleName')']]* (sub elements) |
| Namespace: : | = | '' \| Name['.'Name]* |
| ConceptName: | := | Name |
| ElementName: | := | Name['['Number']'] |
| | | (Number is for array type indices) |
| RoleName: : | = | Name |
| Name: : | = | any legal C# name |
| Number: : | = | any non-negative integer |

An example of an even more simplified syntax that can be implemented is:

Identifier: : = Namespace':'
ConceptName['('RoleName')'](root concept)
['+'ConceptName['('RoleName')']]* (nested concepts)
['.'ElementName['('RoleName')']]* (sub elements)
Namespace: : = " | NamespaceSegment['.'NamesaceSegment]*
ConceptName: := Name
ElementName: := Name
RoleName: : = A valid name (e.g., might not allow characters like {"!", "#", "&"}etc.
NamespaceSegment: : = One or more characters, except {":","."}which are delimiters
Name: : = One or more characters, except {":",".","(",")","+"}which are delimiters
Colon ':' is a delimiter character that goes after the namespace
Plus '+' is a delimiter character that goes before a nested concept
Left bracket '(' is a delimiter character that goes before a role name
Right bracket ')' is a delimiter character that goes after a role name
Dot '.' is a delimiter char that goes before a sub model element name While the name-based identification schemes described herein provide uniqueness and address maintenance issues at development time, they are computationally inefficient to use during execution. Compared to applications that identify model elements using integers, looking up by names (which in practice can be very long since they include namespaces) is significantly slower. To address this inefficiency, in one embodiment, efficient handles are utilized during execution. The handles are illustratively assigned when the models are deployed to a runtime execution environment.

Figure 4:
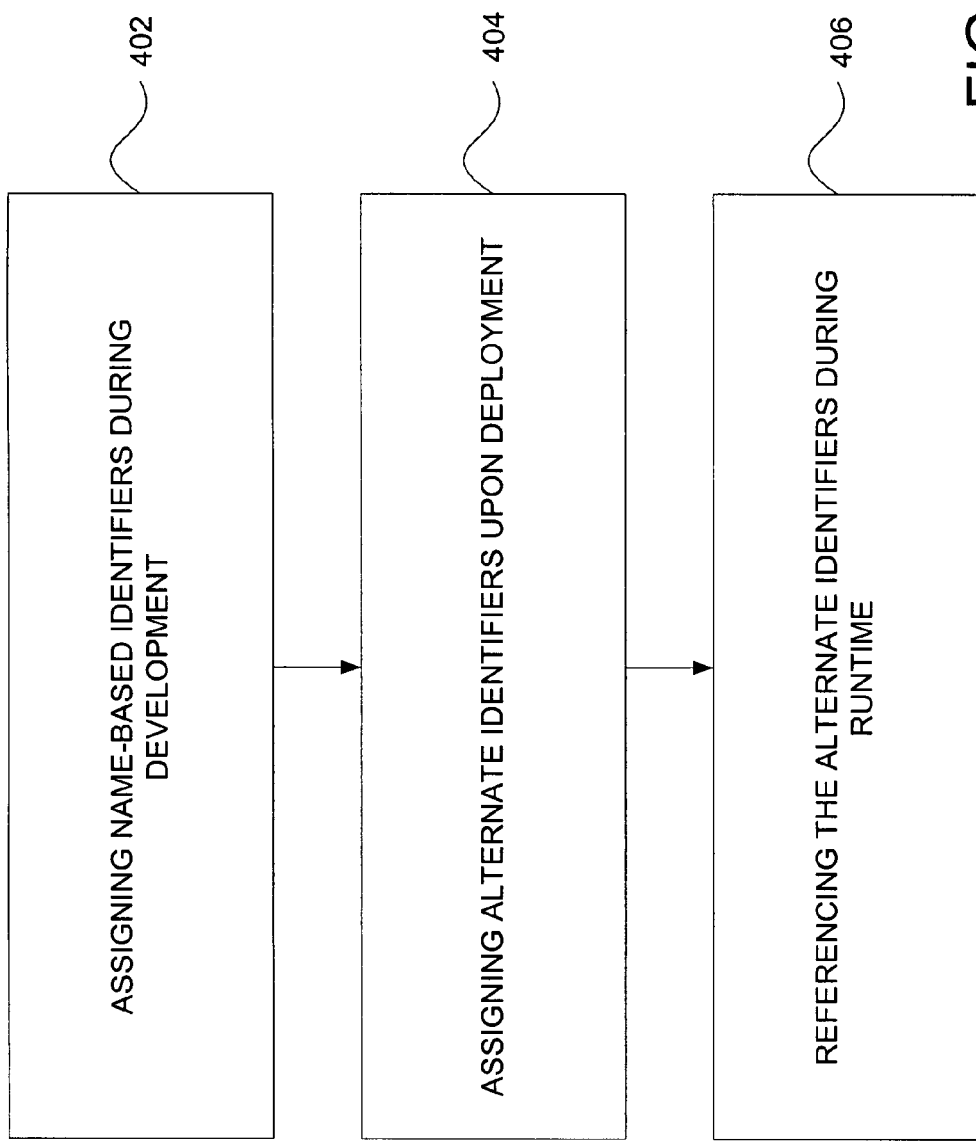
FIG. 4 is a block flow diagram demonstrating steps associated with utilizing an alternative to name-based identifiers in a runtime environment.

FIG. 4 is a block flow diagram demonstrating steps associated with replacing a name-based system with a handle-based system in a runtime environment. In accordance with block 402, name-based identifiers are assigned to model elements during development. In accordance with block 404 alternate identifiers are assigned upon deployment. In accordance with block 406, the alternate identifiers are using during runtime in place of the corresponding name-based identifiers.

Thus, in one embodiment, a computationally efficient datatype identifies each model element at runtime. This datatype is referred to herein as a "handle." A handle is assigned to each element during deployment and is used to identify and refer to model elements during runtime. In one embodiment, but not by limitation, an integer data type is used for the handles.

Those skilled in the art will appreciate that devising an efficient allocation scheme for the handles is somewhat dependent upon the implementation of the runtime model store. For the purpose of providing a complete description, an example allocation scheme will now be provided. It is to be understood that the scope of the present invention is not limited to this allocation scheme, nor to any of its described components. The scheme proposes an assignment of consecutive numbers to elements that are typically loaded together. This is particularly advantageous for model store implementations where each model element occupies one row in the database, and where loading a metadata element almost always means fetching all sub-elements of a single concept.

In one embodiment, steps in a scheme for effectively allocating integer handles when deploying models using name-based identifiers to a runtime model store based on a database engine (e.g., MS SQL Server) include:

1. Start each concept on 1+a number divisible by $1024^2$, then allocate handles for sub-elements in steps of 1
   a. This ensures that all sub-elements of a concept belong to the same 1024-block (large concepts that comprise more than 1024 sub-elements may occupy several not necessarily consecutive blocks). Typically, a runtime model store needs to provide all of the sub-elements with a concept as efficiently as possible and therefore optimization by spanning as few blocks of consecutive records as possible is desirable.
2. Allocate handles (or re-use, if already allocated) when:
   a. deploy the element
   b. find a reference to another element
   c. This ensures that existing sub-elements keep their handles as the concept gets updated to new versions and that all handles are allocated to a deployed model in a single pass over the elements.
   d. In this manner, it is known if all referenced elements have been deployed and inconsistencies and be flagged and addressed appropriately.

Accordingly, embodiments described herein pertain to the use of human-friendly names, rather than machine-friendly identifiers such as integers or GUIDS, to identify model elements. There are several advantages associated with organizing a system this way. Doing it this way enables a human—rather than a machine—to be in control of the identification system. The human decides explicitly on meaningful names, has the freedom to temporarily work with non-unique names, and controls how naming conflicts will be resolved. Doing it this way also avoids having to "pretend" that the system always maintains the identifiers, when in reality there are times that manual fix up of identifiers is required, such as when copying pieces of a model. These are just some of the advantages associated with providing a system that enables model references that are easily intelligible to humans.

Further, embodiment described herein pertain to the concept of using a namespace approach to uniquely identify model elements. This also supports human intelligibility. Further, it avoids requiring central management of pools of numbers (e.g., pools of integers). It also enables multiple independent parties to name elements without colliding.

Embodiment of the present invention enable the decision of whether to scope names by parent or collection to be defined separately for each collection in a metamodel. Further, embodiments enable the scoping of names of model elements by the type of model element to be defined as a decoration of the type. Further, embodiments provide the concept of an optimized local reference to a model element, which is nested within the same top-level element in a hierarchy. For such local references, a short form of an identifier can be unambiguously used. Further, embodiments provide the concept of a syntax in general, as well as a syntax designed to optimize effective resolution of references in a model-centric environment. Still further, embodiments enable a maintaining of name-based identifiers and references in source and deployment artifacts, but using a computationally highly efficient, installation-specific "handle" at runtime. In one embodiment, the handles are assigned at deployment time.

Figure 5:
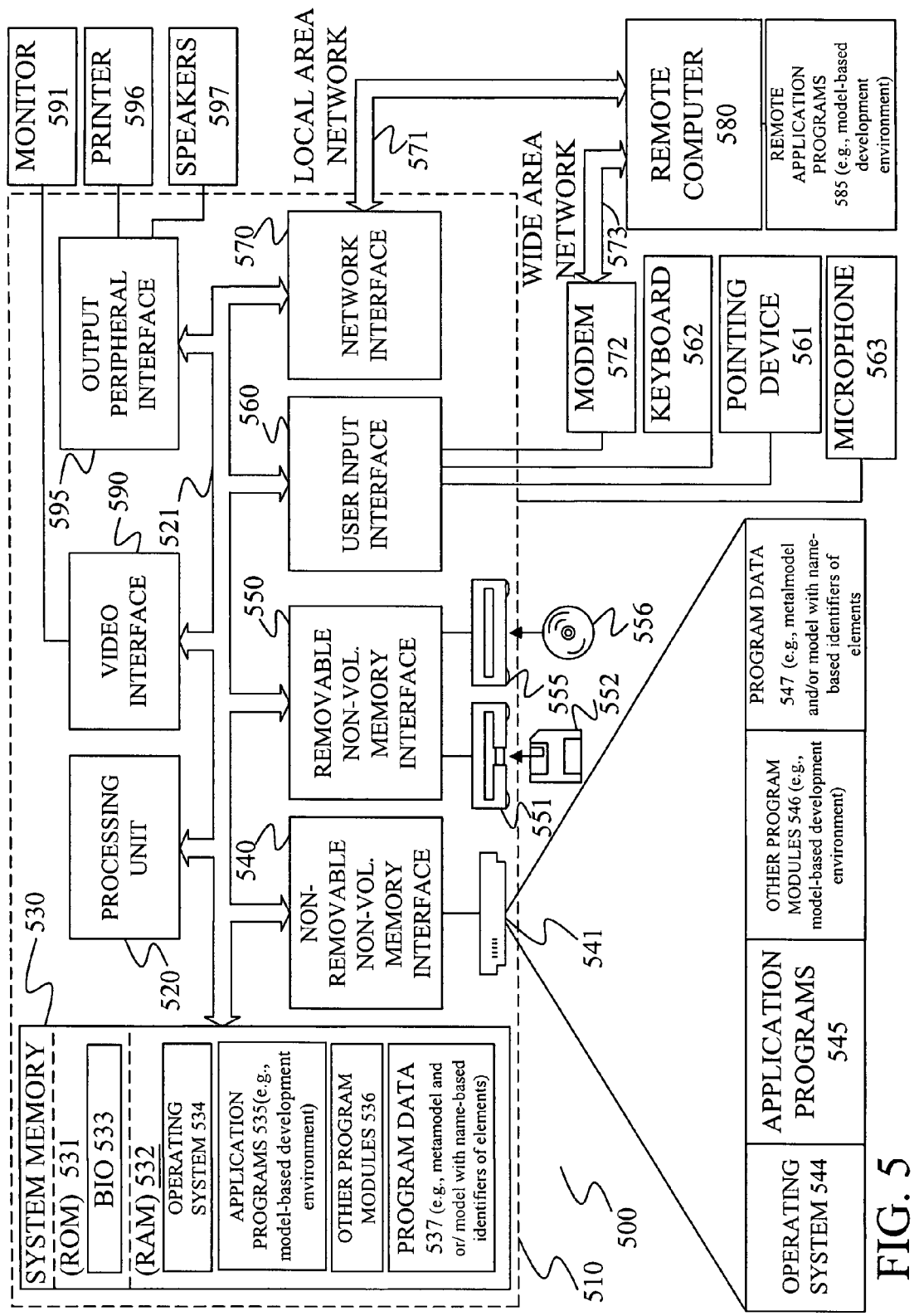
FIG. 5 illustrates an example of a computing system environment.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. As is indicated, programs 535 may include some or all components of a model-based development environment incorporating features that reflect embodiments of the present invention. Further, program data 537 is illustrated as including a model with name-based identifiers of elements consistent with embodiments of the present invention described herein.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives, and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. As is indicated, programs 545 may include some or all components of a model-based development environment incorporating features that reflect embodiments of the present invention. Further, program data 547 is illustrated as including a model with name-based identifiers of elements consistent with embodiments of the present invention described herein.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used. As is indicated, programs 585 may include some or all components of a model-based development environment incorporating features that reflect embodiments of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a model having a namespace, a sub-namespace nested within the namespace, a top-level element nested within the sub-namespace, and a plurality of model elements nested within the top-level element, each of the plurality of model elements having a unique identifier, the identifiers being recorded on a computer-readable medium and including a plurality of text-based sub-components, a first one of the plurality of text-based sub-components including a namespace part and a second one of the plurality of text-based sub-components including a name part, the namespace part including an indication of the namepace and an indication of the sub-namespace, the indication of the namespace being a name of the namespace, the indication of the sub-namespace being a name of the sub-namespace, and wherein the name part includes an indication of the top-level element and an indication of the associated model element that each are indicative of an identifying characteristic of the associated model element, the indication of the top-level element being a name of the top-level element, and wherein the indication of the associated model element is a name of the associated model element; and
a computer processor that is a component of a computer that utilizes a runtime framework to execute the model.

2. The system of claim 1, wherein the namespace part is set apart from the name part by a first character.

3. The system of claim 2, wherein the indication of the namespace is set apart from the indication of the sub-namespace by a second character, wherein the indication of the top-level element is set apart from the indication of the associated model element by the second character, and wherein the first character is a different character than the second character.

4. The system of claim 1, wherein at least one sub-component of each identifier includes a word.

5. The system of claim 1, wherein each sub-component of each identifier includes a word.

6. The system of claim 1, wherein at least one identifier includes a sub-component that is selected through human-input.

7. The system of claim 1, wherein each identifier is organized such that its sub-components are consistent with a predetermined naming convention.

8. The system of claim 7, further comprising a metamodel containing an indication of a parameter to be applied in the context of the predetermined naming convention.

9. The system of claim 8, wherein the parameter is indicative of a scoping preference.

10. A computer-implemented method of managing model elements within a model-centric software environment, the method comprising:
assigning identifiers to model elements within a model, wherein each of the identifiers includes a plurality of word-based sub-components that each are indicative of an identifying characteristic of the associated model element;
assigning, upon deployment of the model elements to a runtime execution environment, alternate identifiers to the model elements, wherein each of the alternate identifiers is associated with a number and the alternate identifiers are assigned to the model elements such that model elements that are loaded together have alternate identifiers that are associated with consecutive numbers; and
utilizing a computer processor that is a component of a computer to reference the alternate identifiers during a runtime process.

11. The method of claim 10, wherein assigning the alternate identifiers comprises assigning integer handles.

12. The method of claim 10, wherein assigning the identifiers to the model elements within the model further comprises setting the word-based sub-components for each of the identifiers apart from one another by a punctuation character.

13. The method of claim 10, wherein assigning the identifiers to the model elements within the model comprises assigning identifiers that include sub-components that are indications of a namespace.

14. The method of claim 10, wherein assigning the identifiers to the model elements within the model comprises assigning at least one sub-component that is selected through human-input.

15. The method of claim 10, wherein assigning the identifiers to the model elements within the model comprises assigning such that each identifier is organized with its sub-components consistent with a predetermined naming convention.

16. The method of claim 10, wherein assigning the identifiers to the model elements within the model comprises assigning so as to be consistent with an indication of a naming preference.

17. The method of claim 10, wherein assigning the identifiers to the model elements within the model comprises assigning so as to be consistent with an indication of a scoping preference.

* * * * *